April 10, 1962 K. R. HIGHTON 3,029,402
INDUCTIVE WINDINGS
Filed Sept. 28, 1959
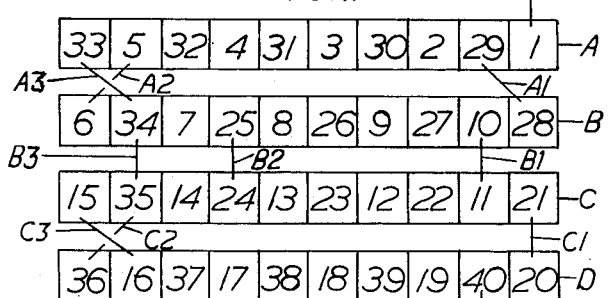
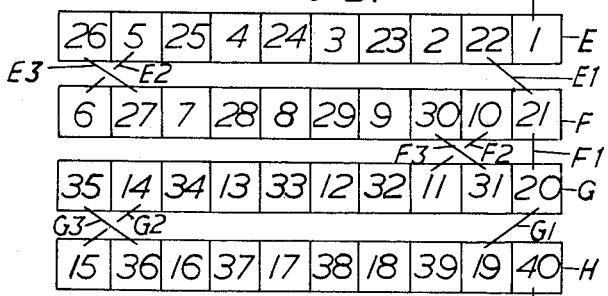
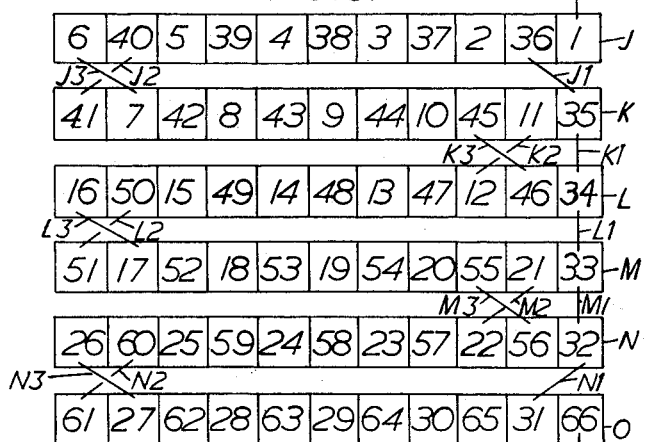
Inventor
Keith Russell Highton
By Cameron, Kerkam & Sutton
Attorneys

United States Patent Office 3,029,402
Patented Apr. 10, 1962

3,029,402
INDUCTIVE WINDINGS
Keith Russell Highton, Chadderton, England, assignor to Ferranti, Limited, Hollinwood, England, a company of Great Britain and Northern Ireland
Filed Sept. 28, 1959, Ser. No. 842,683
Claims priority, application Great Britain Oct. 16, 1958
2 Claims. (Cl. 336—180)

This invention relates to inductive windings suitable for use, for example, in transformers.

In transformers in which a winding is likely to be subjected to steep-fronted voltage surges, due for example, to lightning strikes on a line to which the transformer is connected, it is advantageous to make the series capacitance of the winding as large as possible to cause the voltage distribution to be even over the winding as a whole.

It is an object of the present invention to provide an inductive winding having a high series capacitance.

According to the present invention an inductive winding comprises one or more groups of turns, each group comprising a first, a last, and an even number of intermediate spirally wound annular sections, said sections being spaced apart along a common axis, the windings of said sections spiralling alternately inwards and outwards, and cross connections made between adjacent sections in such manner that a single conductive path is formed which passes a first time through the group by way of alternate turns of the first section, at least one turn of each of the intermediate sections and alternate turns of the last section, returns through the group to the first section by way of at least one turn of each of the intermediate sections, and passes a third time through the group by way of the remaining turns of each section.

Each of said sections may be formed from two single conductors wound in such manner that each turn of one conductor is adjacent to, but insulated from, at least one turn of the other conductor.

The invention will now be described by way of example with reference to the accompanying drawings in which:

FIGURE 1 shows diagrammatically a radial section of a group of annular sections forming a winding in accordance with the invention, FIGURE 2 shows diagrammatically a radial section of a group of annular sections forming a further form of winding in accordance with the invention, and FIGURE 3 shows diagrammatically a radial section of a group of annular sections forming a third form of winding in accordance with the invention.

In each of the drawings it is to be assumed that the common axis (not shown) of the radial sections is to the left of the drawing.

Referring now to FIGURE 1 of the drawings there is shown a winding consisting of one group of four annular sections A, B, C and D each of which has ten turns formed by five turns of each of two conductors which are wound in such manner that each turn of one conductor is adjacent to, but insulated from at least one turn of the other conductor. Thus in section A the turns 1, 2, 3, 4 and 5 are formed by one conductor and the turns 29, 30, 31, 32 and 33 are formed by the other conductor. The windings of sections A and C spiral inwards towards the common axis and the windings of sections B and D spiral outwards.

Three cross connections A1, A2 and A3 are made between sections A and B, three cross connections B1, B2 and B3 are made between sections B and C, and three cross connections C1, C2 and C3 are made between sections C and D. The cross connections A2, A3, C2 and C3 are continuations of the conductors forming sections A and C respectively and the cross connections A1, B1 and C1 are made by joining the free ends of the conductors forming the relevant sections. The cross connections B2 and B3 are made by cutting the conductors and joining them internally in a manner well known in the coil winding art.

By providing the cross connections in the manner shown in FIGURE 1 a single conductive path is formed, the numerals 1 to 40 indicating the route taken by this conductive path. It will be seen that the conductive path passes a first time through the group by way of alternate turns in each of the sections A, B, C and D, returns through the group to the section A by way of four turns in each of the intermediate sections C and B and then passes a third time through the group by way of the remaining turns in each of the sections A, B, C and D. This results in the twenty-ninth turn of the winding being disposed between the first and second turns, the thirtieth turn being disposed between the second and third turns and so on, which results in an inductive winding having a high series capacitance.

FIGURE 2 of the drawings shows a winding similar to that shown in FIGURE 1 in that it has four sections E, F, G and H each of which has ten turns. The windings of sections E and G spiral inwards towards the common axis and the windings of sections F and H spiral outwards.

In this winding, however, the positions of the cross connections E1, E2, E3; F1, F2, F3; and G1, G2, G3 between sections E and F, F and G, and G and H respectively, have been altered to give a winding which is simpler to wind. The group is wound in the following manner. The whole of section E, the inner nine turns of each of sections F and G, and the whole of section H are wound by the continuous disc method from two conductors in such manner that each turn of one conductor is adjacent to, but insulated from, at least one turn of the other conductor. The conductor cross-overs between the sections form the cross connections E2, E3, F, F3, G2 and G3 without any cutting and joining of the conductors. After winding section H the conductor forming the outer turn is terminated in a suitable manner, but the other conductor is continued to form the tenth turn of each of the sections G and F, the conductor forming the cross connections G1 and F1, again without any cutting and joining. When the tenth turn of section F has been wound the conductor is cut and joined to the free end of the conductor forming the second turn of the section E, this being the only joint which it is necessary to make in the whole winding.

By winding the sections and making the cross connections in this way a single conductive path is formed and it will be seen from the numerals 1 to 40 that this passes a first time through the group by way of alternate turns of the section E, five turns of the section F, four turns of section G and alternate turns of section H. The path then returns to the section E by way of one turn of each of sections G and F and then passes a third time through the group by way of remaining turns in each section.

FIGURE 3 shows a larger winding consisting of a group of six sections J, K, L, M, N and O, each of which has eleven turns. The windings of sections J, L and N spiral inwards towards the common axis and the windings of sections K, M and O spiral outwards. This winding is wound in a similar manner to the winding shown in FIGURE 2. The whole of section J, the inner ten turns of sections K, L, M and N, and the whole of section O are wound by the continuous disc method from two conductors in such manner that each turn of one conductor is adjacent to, but insulated from, at least one turn of the other conductor. After winding the section O the conductor forming the outer turn is terminated in a suitable manner and the other conductor is continued to form the eleventh turn on each of the sections N, M, L, and K after which it is cut and joined to the free end of the conductor forming the second turn of the section J. The cross connections J2, J3, K2, K3, L2, L3, M2, M3, N2 and N3 are formed by the conductor cross-overs between the relevant sections, and the cross connections N1, M1, L1 and K1 are formed by the continuations of the conductor forming the eleventh turns on these sections. Therefore, as in the previous example, the cross connection J1 is the only connection which requires cutting and joining of the conductors.

As in the previous examples a single conductive path is formed by the provision of the cross connections in the manner described and it will be seen from the numerals 1 to 66 that the path passes a first time through the group by way of alternate turns of section J, five turns of each of sections K, L, M and N, and alternate turns of section O. The path then returns through the group to section J by way of one turn of each of sections N, M, L and K, and then passes a third time through the group by the remaining turns in each section.

In the examples described above the windings have been shown as only having one group of sections. It will be appreciated that a single winding may have any number of groups, the last turn in one group being connected to the first turn in the next group.

What I claim is:
1. An inductive winding comprising one or more groups of turns, each group comprising a first, a last, and an even number of intermediate spirally wound annular sections, said sections being spaced apart along a common axis, the windings of said sections spiralling alternately inwards and outwards, and cross connections made between adjacent sections in such manner that a single conductive path is formed which passes a first time through the group by way of alternate turns of the first section, at least one turn of each of the intermediate sections and alternate turns of the last section, returns through the group to the first section by way of at least one turn of each of the intermediate sections, and passes a third time through the group by way of the remaining turns of each section.

2. An inductive winding as claimed in claim 1 in which each section is formed from two single conductors wound in such manner that each turn of one conductor is adjacent to, but insulated from, at least one turn of the other conductor.

References Cited in the file of this patent

FOREIGN PATENTS

| | | |
|---|---|---|
| 516,823 | Italy | Feb. 24, 1955 |
| 950,138 | Germany | Oct. 4, 1956 |